US010419554B2

(12) United States Patent
Young et al.

(10) Patent No.: US 10,419,554 B2
(45) Date of Patent: Sep. 17, 2019

(54) SYSTEMS AND METHODS FOR SHARING INFORMATION

(71) Applicant: Facebook, Inc., Menlo Park, CA (US)

(72) Inventors: Sue Yee Young, Los Altos, CA (US); Matej Hrescak, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 329 days.

(21) Appl. No.: 14/939,906

(22) Filed: Nov. 12, 2015

(65) Prior Publication Data

US 2017/0142210 A1 May 18, 2017

(51) Int. Cl.
| | |
|---|---|
| *H04L 29/08* | (2006.01) |
| *H04L 12/58* | (2006.01) |
| *G06F 3/0484* | (2013.01) |
| *G06F 3/0481* | (2013.01) |

(52) U.S. Cl.
CPC .......... *H04L 67/18* (2013.01); *G06F 3/0481* (2013.01); *G06F 3/04817* (2013.01); *G06F 3/04842* (2013.01); *H04L 51/32* (2013.01); *H04L 67/22* (2013.01)

(58) Field of Classification Search
CPC ......... H04L 67/18; H04L 51/32; H04L 67/22; G06F 3/0481; G06F 3/04817; G06F 3/04842
See application file for complete search history.

(56) References Cited

U.S. PATENT DOCUMENTS

| | | | | |
|---|---|---|---|---|
| 9,256,615 | B2* | 2/2016 | Rados | G06F 17/30241 |
| 9,307,034 | B1* | 4/2016 | Keyani | H04L 67/20 |
| 9,391,993 | B1* | 7/2016 | Winer | H04L 63/101 |
| 2006/0053379 | A1* | 3/2006 | Henderson | G06F 3/0481 |
| | | | | 715/751 |
| 2011/0106528 | A1* | 5/2011 | Maddison | H04L 12/5815 |
| | | | | 704/9 |
| 2012/0066316 | A1* | 3/2012 | Petersen | G06F 17/30144 |
| | | | | 709/206 |
| 2013/0104070 | A1* | 4/2013 | Blake | G06Q 50/01 |
| | | | | 715/777 |
| 2013/0166465 | A1* | 6/2013 | Barros | G06Q 10/1053 |
| | | | | 705/319 |
| 2013/0290458 | A1* | 10/2013 | Morris | H04L 51/00 |
| | | | | 709/206 |
| 2014/0274107 | A1* | 9/2014 | Rados | G06F 17/30241 |
| | | | | 455/456.1 |
| 2014/0365484 | A1* | 12/2014 | Freeman | G06Q 50/01 |
| | | | | 707/736 |

(Continued)

*Primary Examiner* — Jerry B Dennison
(74) *Attorney, Agent, or Firm* — Sheppard Mullin Richter & Hampton LLP

(57) ABSTRACT

Systems, methods, and non-transitory computer-readable media can access an interface through which respective status updates of one or more users of a social networking system are provided, wherein a status update of a user indicates at least an activity and a geographic location corresponding to the activity. A determination is made that a first user has selected an option for setting a status update of the first user. Information from the first user to be used for setting the status update is obtained. The status update for the first user is set based at least in part on the obtained information, wherein the interface is updated to include the status update for the first user.

17 Claims, 11 Drawing Sheets

(56) References Cited

U.S. PATENT DOCUMENTS

| | | | |
|---|---|---|---|
| 2015/0116358 A1* | 4/2015 | Choi | G06T 9/00 |
| | | | 345/633 |
| 2015/0163309 A1* | 6/2015 | Arnoud | H04L 67/18 |
| | | | 455/456.3 |
| 2015/0172394 A1* | 6/2015 | Lapenna | H04L 67/18 |
| | | | 715/751 |
| 2016/0044127 A1* | 2/2016 | Filner | H04L 67/2847 |
| | | | 709/213 |
| 2016/0117347 A1* | 4/2016 | Nielsen | G06F 17/30256 |
| | | | 707/738 |
| 2016/0330158 A1* | 11/2016 | Gonzales | H04L 51/02 |
| 2017/0006421 A1* | 1/2017 | Jerez | H04W 4/023 |
| 2017/0019856 A1* | 1/2017 | Papakipos | G06Q 10/10 |
| 2017/0150037 A1* | 5/2017 | Rathod | H04N 5/23216 |

\* cited by examiner

SYSTEMS AND METHODS FOR SHARING INFORMATION

FIELD OF THE INVENTION

The present technology relates to the field of content sharing. More particularly, the present technology relates to techniques for sharing information between users.

BACKGROUND

Today, people often utilize computing devices (or systems) for a wide variety of purposes. Users can use their computing devices to, for example, create documents, read articles, view images, watch videos, listen to audio, and engage in communications. In some instances, a user of a computing device can access or interact with a social networking service (or system) using the computing device. The user can connect with other users within the social networking service. The user can also send messages to and receive messages from other users within the social networking service.

SUMMARY

Various embodiments of the present disclosure can include systems, methods, and non-transitory computer readable media configured to access an interface through which respective status updates of one or more users of a social networking system are provided, wherein a status update of a user indicates at least an activity and a geographic location corresponding to the activity. A determination is made that a first user has selected an option for setting a status update of the first user. Information from the first user to be used for setting the status update is obtained. The status update for the first user is set based at least in part on the obtained information, wherein the interface is updated to include the status update for the first user.

In an embodiment, systems, methods, and non-transitory computer readable media are configured to receive at least a description of an activity performed by the first user and a geographic location corresponding to the activity.

In an embodiment, systems, methods, and non-transitory computer readable media are configured to determine that the first user was tagged in a post made by a second user through the social networking system, wherein the post was made subsequent to the status update, and wherein the post indicates at least an activity or geographic location and set a second status update for the first user based at least in part on the post, wherein the interface is updated to replace the status update with the second status update.

In an embodiment, systems, methods, and non-transitory computer readable media are configured to determine that the first user was tagged in a content item posted by a second user through the social networking system, wherein the content item was posted subsequent to the status update, and wherein the content item is associated with one or more tags that indicate at least an activity or geographic location and set a second status update for the first user based at least in part on the tags, wherein the interface is updated to replace the status update with the second status update.

In an embodiment, systems, methods, and non-transitory computer readable media are configured to provide a second interface that includes a list of activities and receive a selection of an activity from the list of activities.

In an embodiment, activities included in the list of activities are determined based at least in part on a geographic location determined for the first user.

In an embodiment, systems, methods, and non-transitory computer readable media are configured to determine a geographic location of the first user, provide a second interface that includes a list of points of interest, wherein points of interest included in the list are located within a threshold distance from the geographic location of the first user and receive a selection of a point of interest from the list of points of interest.

In an embodiment, systems, methods, and non-transitory computer readable media are configured to provide the status update for the first user in a notification to at least one of the one or more users of the social networking system.

In an embodiment, systems, methods, and non-transitory computer readable media are configured to determine that a geographic location specified in the status update of the first user is within a threshold distance from a geographic location specified in a status update of a second user, provide a first notification to the first user that includes at least a portion of the status update of the second user and provide a second notification to the second user that includes at least a portion of the status update of the first user.

In an embodiment, systems, methods, and non-transitory computer readable media are configured to determine that an activity specified in the status update of the first user corresponds to an activity specified in a status update of a second user, provide a first notification to the first user that includes at least a portion of the status update of the second user and provide a second notification to the second user that includes at least a portion of the status update of the first user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
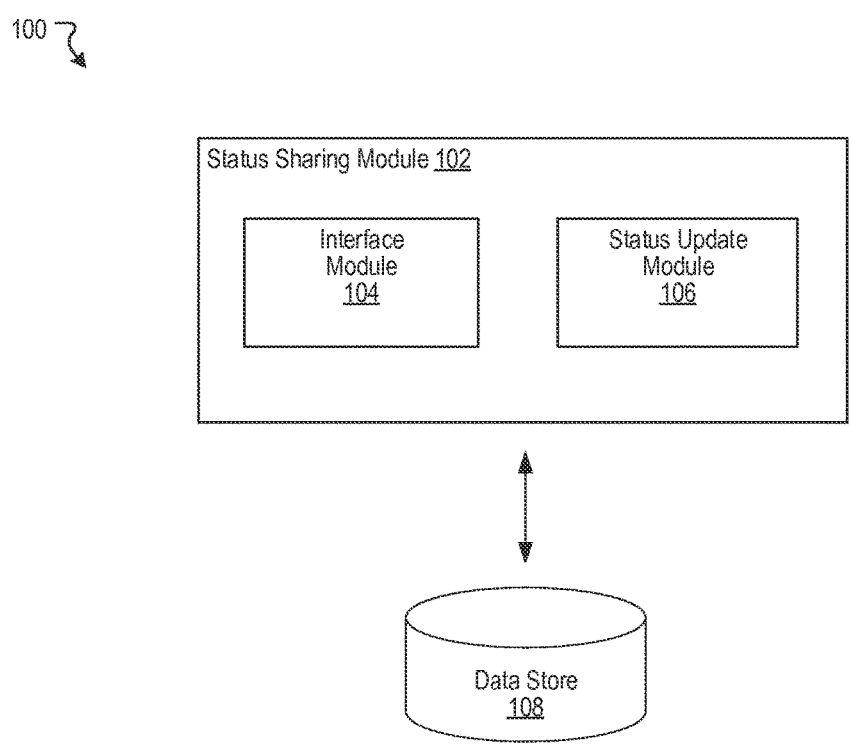
FIG. 1 illustrates an example system including an example status sharing module configured to provide an interface for accessing status updates of users, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Sharing Information

As mentioned, people often utilize computing devices (or systems) for a wide variety of purposes. Users can use their computing devices to, for example, create documents, read articles, view images, watch videos, listen to audio, and engage in communications. In some instances, a user of a computing device can access or interact with a social networking service (or system) using the computing device. The user can connect with other users within the social networking service. The user can also send messages to and receive messages from other users within the social networking service. However, conventional messaging approaches typically do not provide users with a platform, or interface, through which their status updates can be shared with other users of the social networking system (e.g., social connections of the user or "friends"). Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, users of a social networking system can access an interface through which they can share their status updates. Such status updates may describe an activity of the user, for example, as well as a location of the user. The user can also utilize the interface to access status updates that were provided by other users of the social networking system (e.g., friends of the user). Allowing users to set and access such status updates can provide a number of advantages. For example, status updates can be useful when friends of a user are trying to determine the user's whereabouts. In another example, status updates can provide friends with opportunities to learn about each other's shared interests. In some instances, the status of a user can be updated automatically based on information provided by a user to the social networking system, for example, in a post. In various embodiments, status updates set by users can still be accessible to other users (or to a set of authorized users) without requiring that the users remain "online" or connected to the social networking system. Thus, in such embodiments, users can access status updates of a user even if the user is "offline" or disconnected from the social networking system. In some embodiments, a user's status update can trigger one or more notifications to certain users. In one example, if a first user's status update indicates that the first user is watching a particular movie and a second user's status update indicates that the second user is also watching the same movie, then a notification can be sent to the first user and/or the second user to notify the user(s) of the shared activity or interest.

FIG. 1 illustrates an example system 100 including an example status sharing module 102 configured to provide an interface for accessing status updates of users, according to an embodiment of the present disclosure. As shown in the example of FIG. 1, the status sharing module 102 can include an interface module 104 and a status update module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the status sharing module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the status sharing module 102 can be implemented, in part or in whole, as software running on one or more computing devices or systems, such as on a user computing device or client computing system. For example, the status sharing module 102, or at least a portion thereof, can be implemented as or within an application (e.g., app), a program, or an applet, etc., running on a user computing device or a client computing system, such as the user device 710 of FIG. 7. Further, the status sharing module 102, or at least a portion thereof, can be implemented using one or more computing devices or systems that include one or more servers, such as network servers or cloud servers. In some instances, the status sharing module 102 can, in part or in whole, be implemented within or configured to operate in conjunction with a social networking system (or service), such as the social networking system 730 of FIG. 7. It should be understood that there can be many variations or other possibilities.

In some embodiments, the status sharing module 102 can be configured to communicate and/or operate with the at least one data store 108 in the example system 100. The at least one data store 108 can be configured to store and maintain various types of data. In various embodiments, the at least one data store 108 can store data relevant to function and operation of the status sharing module 102. In some implementations, the at least one data store 108 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. It should be appreciated that there can be many variations or other possibilities.

In various embodiments, the interface module 104 can provide an interface (e.g., graphical user interface) through which users can access status updates of other users. For example, the interface can be provided through a software application running on a computing device being operated by a user. The user can interact with the interface, for example, by performing touch screen and/or motion-based gestures through a display screen of the computing device.

The interface provided by the interface module 104 can be customized by the user to include status information about specific users. For example, the interface can be customized to include status information for users of the social networking system that are social connections of the user. Users can also utilize the interface to set, or update, their own status updates which will be shared with other users. In various embodiments, status updates of a user of the social networking system are shared automatically with other users of the social networking system that are social connections (e.g., "friends") of the user. Other implementations are possible, however. For example, users can opt to restrict which users are able to access their status updates by selecting, or defining, a set of authorized users.

The status update module 106 can be configured to set, or update, a user's status. As mentioned, this status can then be made available to other users, for example, through an interface. In some embodiments, the status update module 106 can provide users with an interface for updating their respective status. A user operating a computing device can access the interface to provide various information relating to the user's status including, for example, an activity in which the user is participating, a geographic location of the user, to name some examples. More details regarding the management module 108 will be provided below in reference to FIG. 2.

Figure 2:
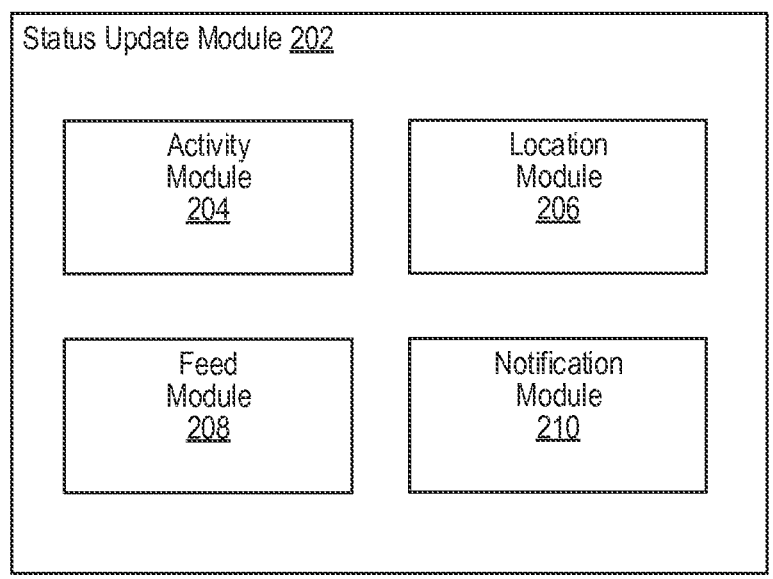
FIG. 2 illustrates an example status update module configured to allow users to update their statuses, according to an embodiment of the present disclosure.

FIG. 2 illustrates an example status update module 202 configured to allow users to update their statuses, according to an embodiment of the present disclosure. In some embodiments, the status update module 106 of FIG. 1 can be implemented with the status update module 202. As shown in the example of FIG. 2, the status update module 202 can include an activity module 204, a location module 206, a feed module 208, and a notification module 210.

As mentioned, the status update module 202 can be configured to provide users with an interface for providing their respective status updates. A user operating a computing device can access the interface to provide various information relating to the user's status including, for example, an activity in which the user is participating, a geographic location of the user, to name some examples. In various embodiments, when a user attempts to set, or update, his or her status, the activity module 204 can provide the user with a list of various activities through the interface. The list of activities can include, for example, "hanging out with friends", "relaxing", "watching TV", "working out", "getting coffee", to name some examples. In some instances, the activities included in the list can be customized based on activities performed by the user in the past. The user can interact with the interface to select an activity in the list to be included in the user's status update. In some embodiments, each activity in the list can also be displayed with a respective icon that provides a graphical representation of the activity. In some embodiments, the list of activities also includes various moods, such as "happy", "excited", "content", and the user can select one of the moods to be included in the user's status update. In various embodiments, the user is not restricted to the activities and/or moods provided in the list and has the option to specify any activity and/or mood in freeform, for example, through a text box included in the interface.

The location module 206 can be configured to determine, or obtain, a geographic location of the user. The geographic location may refer to a point of interest, city, state, country, neighborhood, to name some examples. In some instances, the user can specify the geographic location and/or point of interest at which the user is located and/or the activity specified through the activity module 204 is occurring. In some embodiments, the geographic location and/or point of interest may be determined automatically, for example, using geolocation services provided by the computing device being operated by the user. In such embodiments, the location module 206 can determine a set of suggested points of interest that are located within a threshold radius of the geographic location provided by the computing device. The set of suggested points of interest can be provided in a list through the interface and the user has the option to select one of the points of interest to further refine the geographic location of the user. For example, the location module 206 may determine that the user is located at the intersection of Dolores St. and 16th Street in San Francisco, Calif. In this example the location module 206 may further determine a set of suggested points of interest that are located within a threshold radius of the intersection and the user can select one of the suggested points of interest (e.g., "Barney's Coffee Shop"). In some embodiments, the geographic location of the user and/or the set of suggested points of interest can be utilized to customize the list of activities that can be provided by the activity module 204. For example, if the geographic location of the user corresponds to Yellowstone National Park, then the list of activities may include "hiking", "camping", "sightseeing", for example. The status update module 202 can provide status updates using the activity and location of the user to other users, for example, through an interface. For example, the other users may be social connections, or friends, of the user in a social networking system. In some embodiments, the user can restrict which users are able to access the status updates by selecting, or defining, a set of authorized users.

In some embodiments, the activity and/or location of the user may be obtained from various posts and/or check-ins performed by the user. For example, the user may post content through the social networking system that indicates the user's geographic location and/or an activity being performed by the user. Typically, such posts can then be shared with other users of the social networking system (e.g., friends of the user) by including the posts in the respective news feeds corresponding to the other users. In such instances, the feed module 208 can extract the relevant information (e.g., activity and/or geographic location) from the post and can automatically update the user's status based on the post. For example, the user may share a post "Relaxing at the beach in Santa Monica, Calif.". In this example, the feed module 208 can determine the activity (i.e., "relaxing") and the geographic location (i.e., "Santa Monica, Calif.") and utilize this information for automatically updating the status of the user. In another example, if the user checks into a point of interest (e.g., "Dinner at Big Star Pizza"), then the feed module 208 can automatically update the status of the user to indicate the activity (i.e., "dinner") and the location and/or point of interest (i.e., "Big Star Pizza"). In some embodiments, a status of a user is updated automatically when the user performs a check-in at a point of interest and the updated status can indicate when the user checked into the point of interest. In some embodiments, a status of a user is updated automatically when the user is tagged in a post made to the social networking system by a different user. For example, the post in which the user is tagged may indicate an activity, geographic location, and/or point of interest and such information can be utilized to update the user's status. In some instances, the user may be tagged in a content item, such as an image or video. In such instances, any information (e.g., activity, geographic location, and/or point of interest) associated with the content item, for example, in the post itself or in metadata, can be used to update the user's status. In some embodiments, images and videos can be analyzed using various machine learning and/or neural networks to produce one or more tags that describe the content in the respective images and videos. In such embodiments, these descriptive tags can be utilized for updating the user's status.

In various embodiments, the notification module 210 can be configured to send notification messages to users of the social networking system. In some embodiments, the notification module 210 can send a notification to a first user indicating that a second user selected an option to "like" the first user's status update. In some embodiments, the notification module 210 can send a notification to a first user when any of the first user's social connections or specified authorized users update their status. In some embodiments, the notification module 210 can evaluate the respective status updates of a first user and a second user to determine whether the two users are engaged in the same or similar activity. If the two users are engaged in the same or similar activity, then the notification module 210 can send a notification to both the first user and the second user indicating that they are both involved in the same activity. In another example, the notification module 210 can evaluate the respective status updates of a first user and a second user to determine whether the two users are located within a threshold distance of each other. If the two users are located within a threshold distance of each other, then the notification module 210 can send a notification to both the first user and the second user indicating that they are both near one another. In such embodiments, the notification module 210 can be configured to evaluate the status updates of users that are social connections of one another, or are authorized by one another, rather than every user of the social networking system.

Figure 3A:
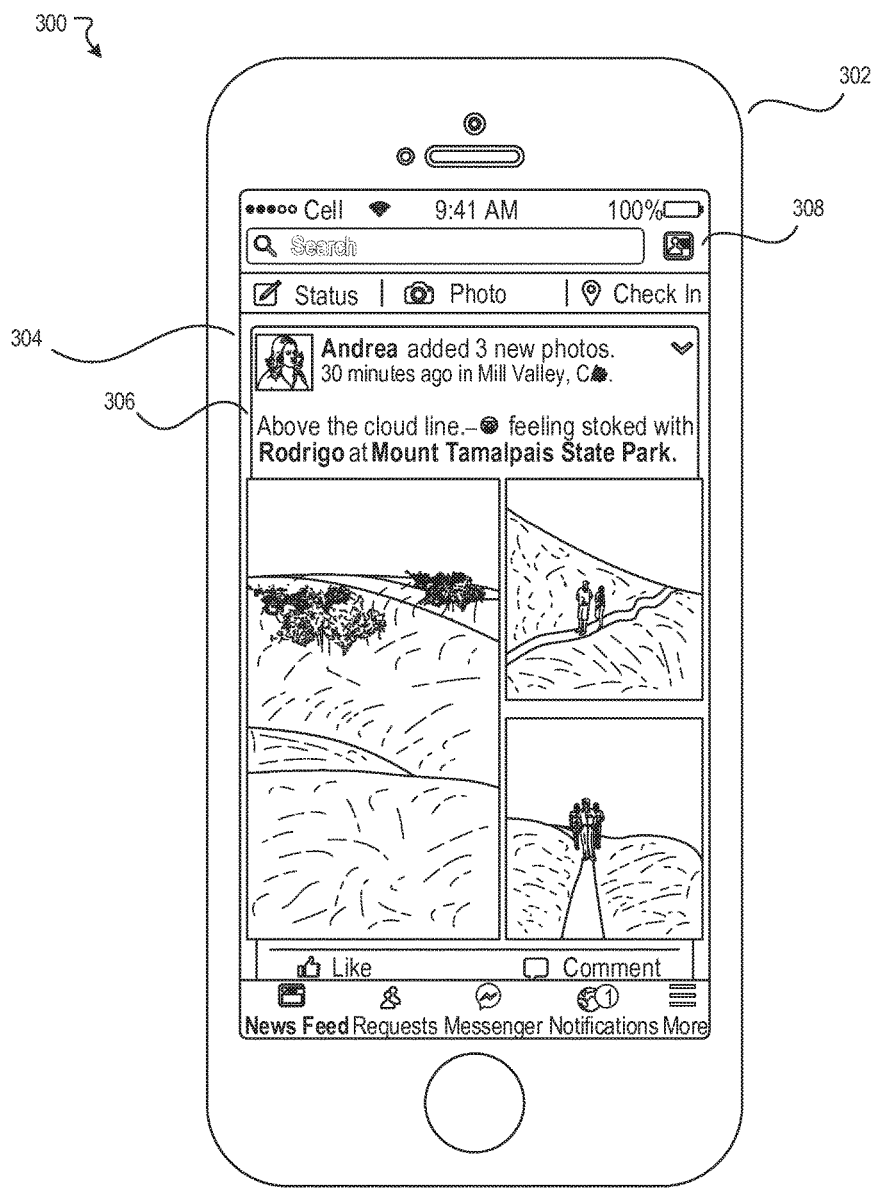
FIGS. 3A-B illustrate example interfaces for accessing user status updates, according to an embodiment of the present disclosure.
Figure 3B:
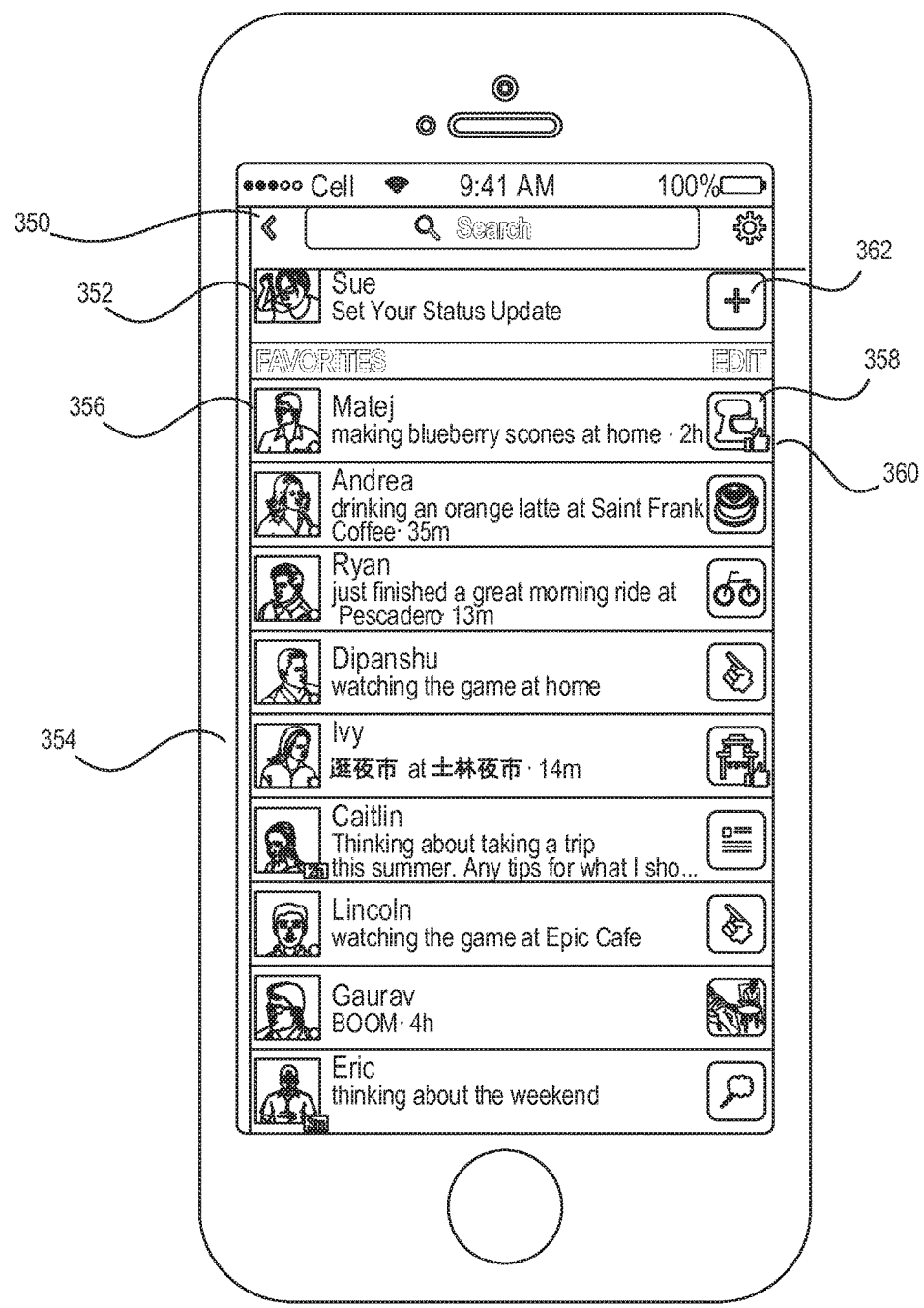

FIGS. 3A-B illustrate example interfaces for accessing user status updates, according to an embodiment of the present disclosure. FIG. 3A illustrates an example 300 of an interface 304 on a computing device 302 for accessing user status updates, according to an embodiment of the present disclosure. In this example, the interface 304 is presented on a display screen of the computing device 302 being operated by a user. Further, the interface 304 may be provided through an application (e.g., a social networking application) running on the computing device 302. In this example, the interface 304 includes a news feed 306 of the user. The user operating the computing device 302 can select, through the interface 304, an option 308 to navigate to an interface through which the user status updates can be accessed, as described in reference to FIG. 3B. As shown in FIG. 3B, the example interface 350 can provide status updates for a list of users 354. In this example, the interface 350 is shown as being accessed by a user 352 through a computing device. In some embodiments, the users included in the list can be social connections of the user 352 operating the computing device. Naturally, the user 352 can customize the list of users 354 for which status updates are shown. In one example, the user 352 can manually specify the users to be included in the list 354. For each user in the list, the interface 350 can provide a respective profile image (or icon), an activity description, and/or geographic location corresponding to the activity or the user. For example, for a user 356, the interface 350 includes a profile image of the user, an activity description (i.e., "making blueberry scones"), a corresponding geographic location (i.e., "at home"), and, in some implementations, an indication for how long the status update has been posted (e.g., "2 hours"). The interface 350 can also provide for the user 352 a respective icon 358 associated with the activity being performed. The icon 358 may be provided by the user 356 or may be set automatically based on the activity description selected by the user when setting the status update. In some embodiments, users can "like" another user's status update as denoted by the thumbs up icon 360. In various embodiments, the user 352 can select an option 362 to update the user's status. As mentioned, the updated status can be made available to other users, such as the users included in the list 354, through an interface that is similar to the interface 350.

Figure 4A:
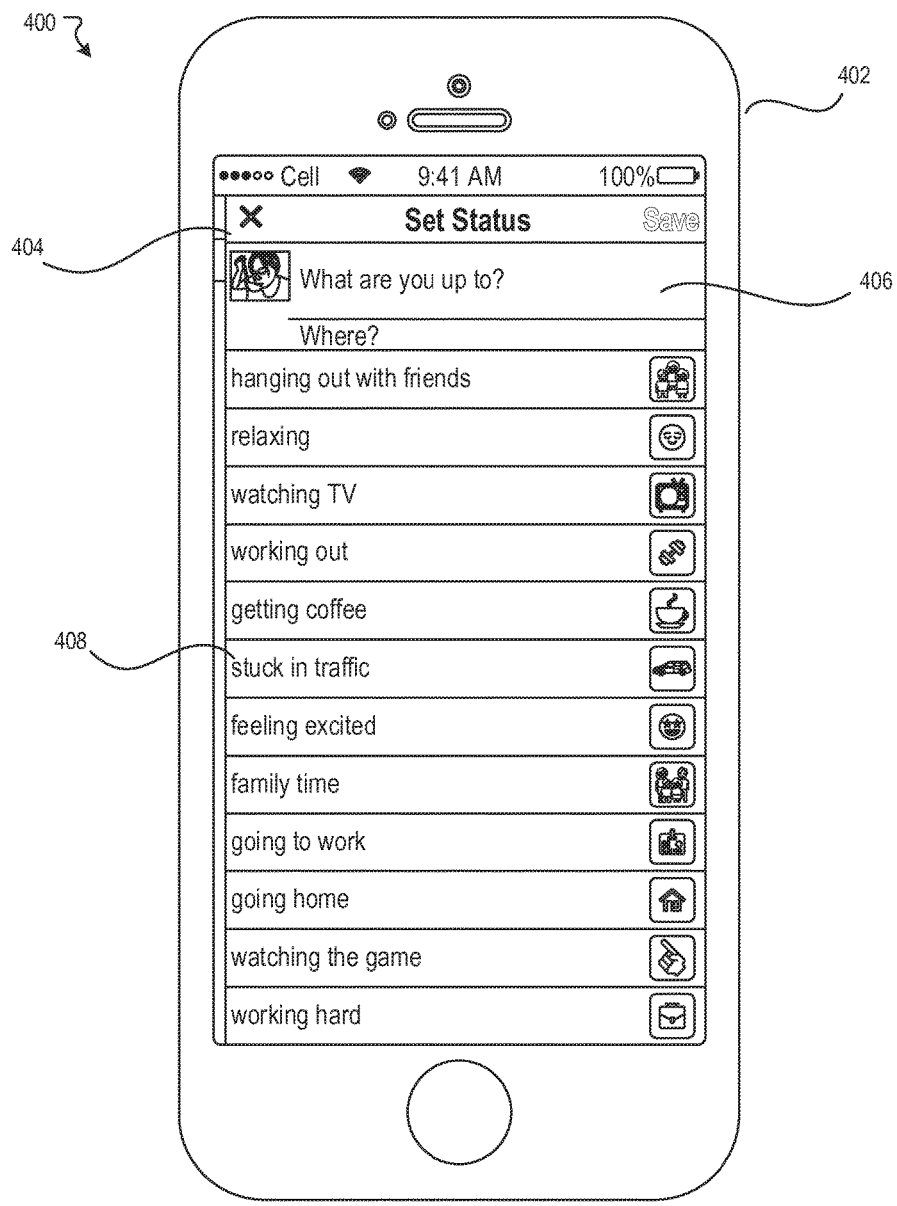
FIGS. 4A-C illustrate example interfaces for updating a user status, according to various embodiments of the present disclosure.
Figure 4B:
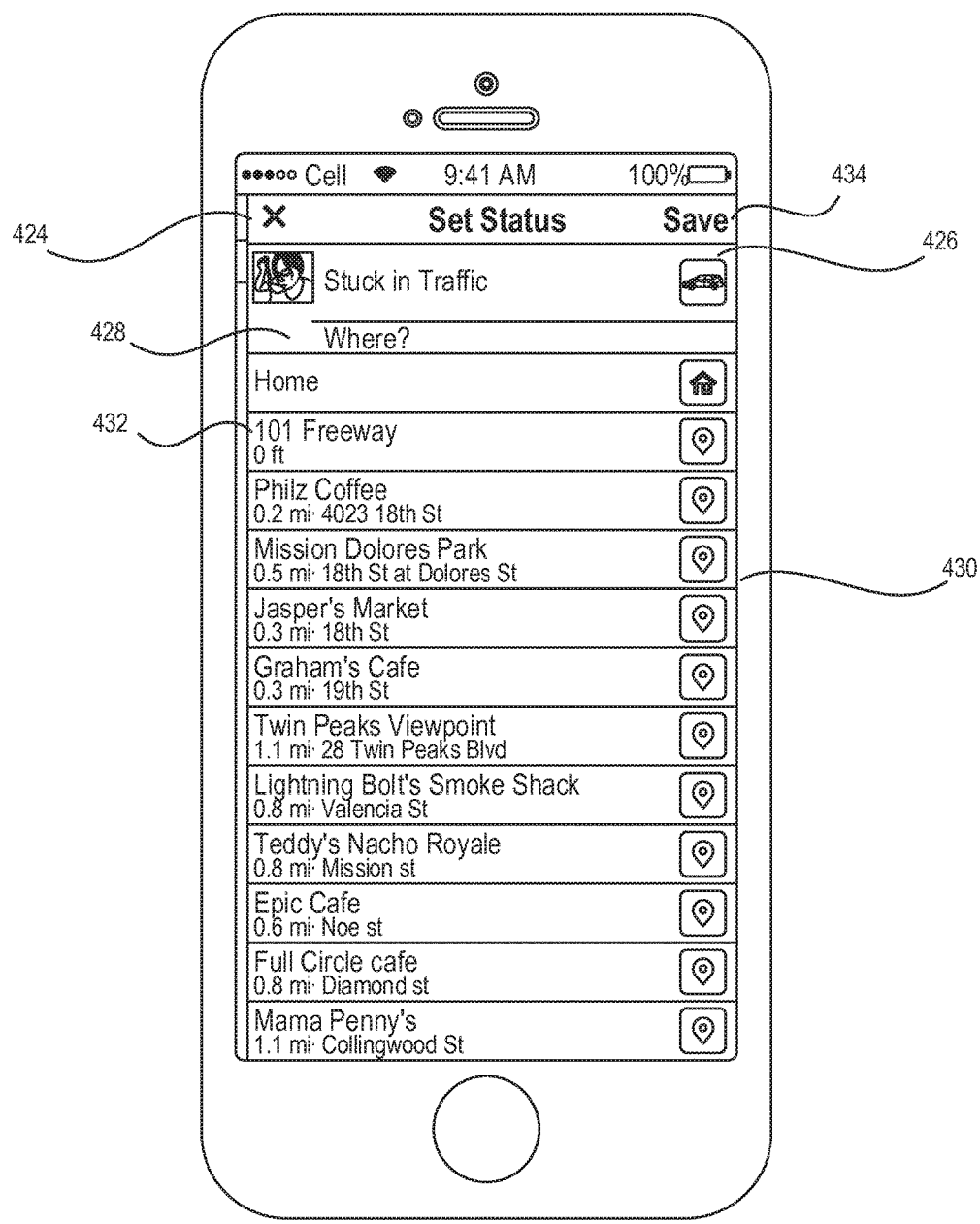
Figure 4C:
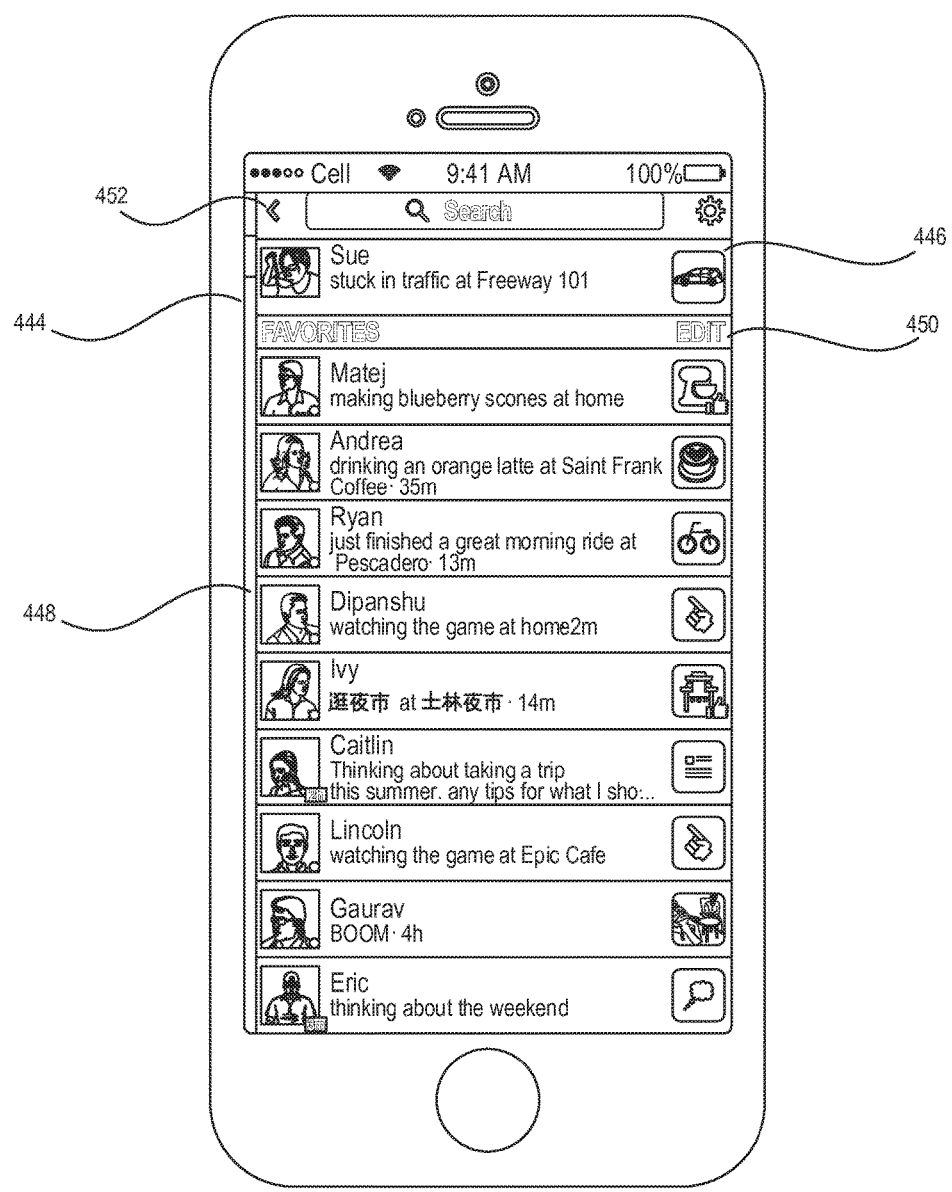

FIGS. 4A-C illustrate example interfaces for updating a user status, according to various embodiments of the present disclosure. FIG. 4A illustrates an example 400 of an interface 404 on a computing device 402 for updating a user status, according to an embodiment of the present disclosure. In this example, the interface 404 is presented on a display screen of the computing device 402 being operated by a user. Further, the interface 404 may be provided through an application (e.g., a social networking application) running on the computing device 402. In this example, the interface 404 can be presented when the user operating the computing device 402 selects an option to set a status update, as described in reference to FIG. 3B. The user operating the computing device 402 can interact with the example interface 404 to specify an activity to be included in the status update. When specifying the activity, the user has the option of inputting the activity in a text field 406 or selecting one from a list of activities 408. The activities included in the list 408 may be defined as default values. In some implementations, the activities in the list 408 may be customized for the user setting the status update, for example, based on activities performed by the user in the past. In another example, the activities in the list 408 may be customized for the user setting the status update based on the geographic location of the user as determined, for example, by the computing device 402. In the example of FIG. 4A, the user has selected the activity 408 "stuck in traffic". Once the activity has been selected, the user can provide a geographic location at which the activity is being performed as shown in FIG. 4B.

In the example of FIG. 4B, the interface 424 shows the activity 426 "stuck in traffic" that was specified by the user in the example of FIG. 4A. In addition to specifying the activity, the user operating the computing device has the option of also specifying a geographic location (e.g., point of interest). The geographic location can correspond to a location at which the activity is being performed and/or a location of the user. When specifying the geographic location, the user has the option of inputting a name of the geographic location in the text field 428 or selecting one from a list of geographic locations 430. In some embodiments, the list 430 includes suggested points of interest that are located within a threshold radius of a geographic location that was determined by the computing device using various geolocation techniques. In the example of FIG. 4B, the user has selected the point of interest 432 "101 Freeway". Upon specifying the activity and/or geographic location, the user can select an option 434 to set the user's status update that can be made available to the user's friends or social connections, for example.

In the example of FIG. 4C, the interface 444 shows the user's status update 446 with the activity "stuck in traffic" and the location "101 Freeway". As mentioned, the user's friends or social connections, or any users included in a set of authorized users specified by the user, can access an interface to view the user's status update 446. In some embodiments, the user can customize (e.g., add and/or delete) which users are shown in the list of users 448 by selecting an option 450. In some embodiments, the user has the option 452 of exiting from the interface 444 and returning to an interface that was previously being accessed by the user, such as the interface 304 including the news feed 306 of the user, as described in reference to FIG. 3A.

Figure 5:
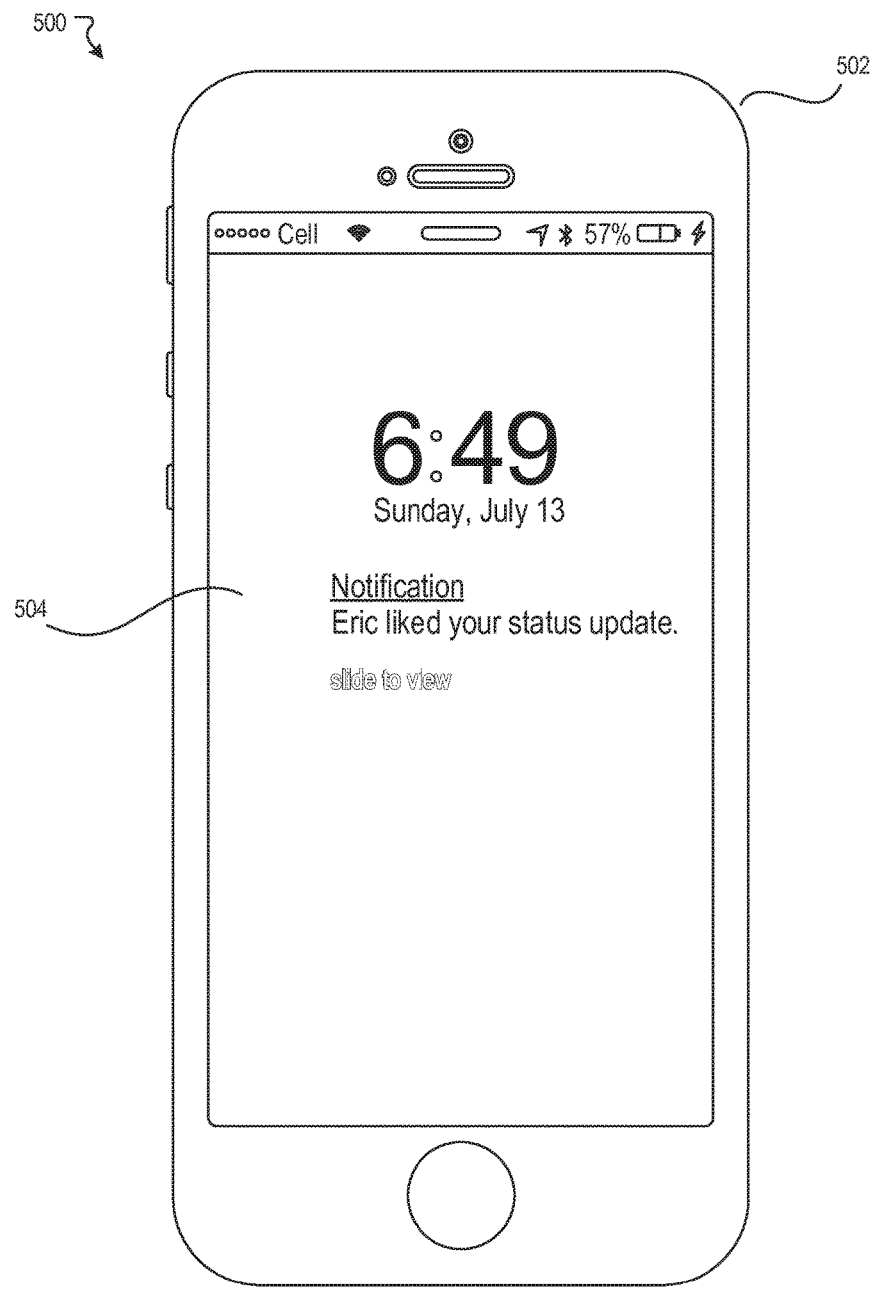
FIG. 5 illustrates an example of a status update notification, according to various embodiments of the present disclosure.

FIG. 5 illustrates an example 500 of a status update notification 504, according to various embodiments of the present disclosure. In this example, the notification 504 is presented on a display screen of a computing device 502 being operated by a user. Further, the notification 504 may be provided by an application (e.g., a social networking application) running on the computing device 502. In various embodiments, notification messages can be sent to the user operating the computing device 502 when another user of the social networking system (e.g., a social connection, or friend, of the user) selects an option to "like" a status update of the user operating the computing device 502. In some embodiments, a notification is sent to the user operating the computing device 502 when any of the user's social connections or specified users update their status. In some embodiments, a notification is sent to the user operating the computing device 502 when another user of the social networking system (e.g., a social connection, or friend, of the user) is engaged in the same or similar activity as the user operating the computing device 502, as determined based on the respective status updates corresponding to the two users. In some embodiments, a notification is sent to the user operating the computing device 502 when the user and another user of the social networking system (e.g., a social connection, or friend, of the user) are within a threshold distance of one another. Naturally, the user can operate the computing device 502 to specify when notifications should be sent and also for which users should the notifications be sent (e.g., for any social connection of the user or for a specified set of social connections).

Figure 6:
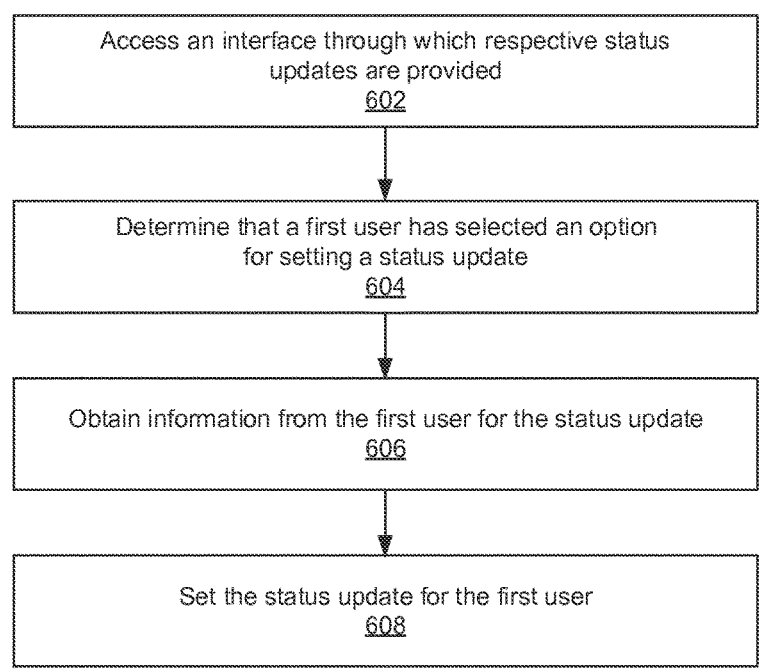
FIG. 6 illustrates an example method for accessing user status updates, according to an embodiment of the present disclosure.

FIG. 6 illustrates an example method for accessing user status updates, according to an embodiment of the present disclosure. It should be appreciated that there can be additional, fewer, or alternative steps performed in similar or alternative orders, or in parallel, within the scope of the various embodiments discussed herein unless otherwise stated. At block 602, the example method 600 can access an interface through which respective status updates of one or more users of a social networking system are provided. A status update of a user can indicate at least an activity and a geographic location corresponding to the activity. At block 604, a determination is made that a first user has selected an option for setting a status update of the first user. At block 606, information from the first user to be used for setting the status update is obtained. At block 608, the status update for the first user is set based at least in part on the obtained information and the interface is updated to include the status update for the first user.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
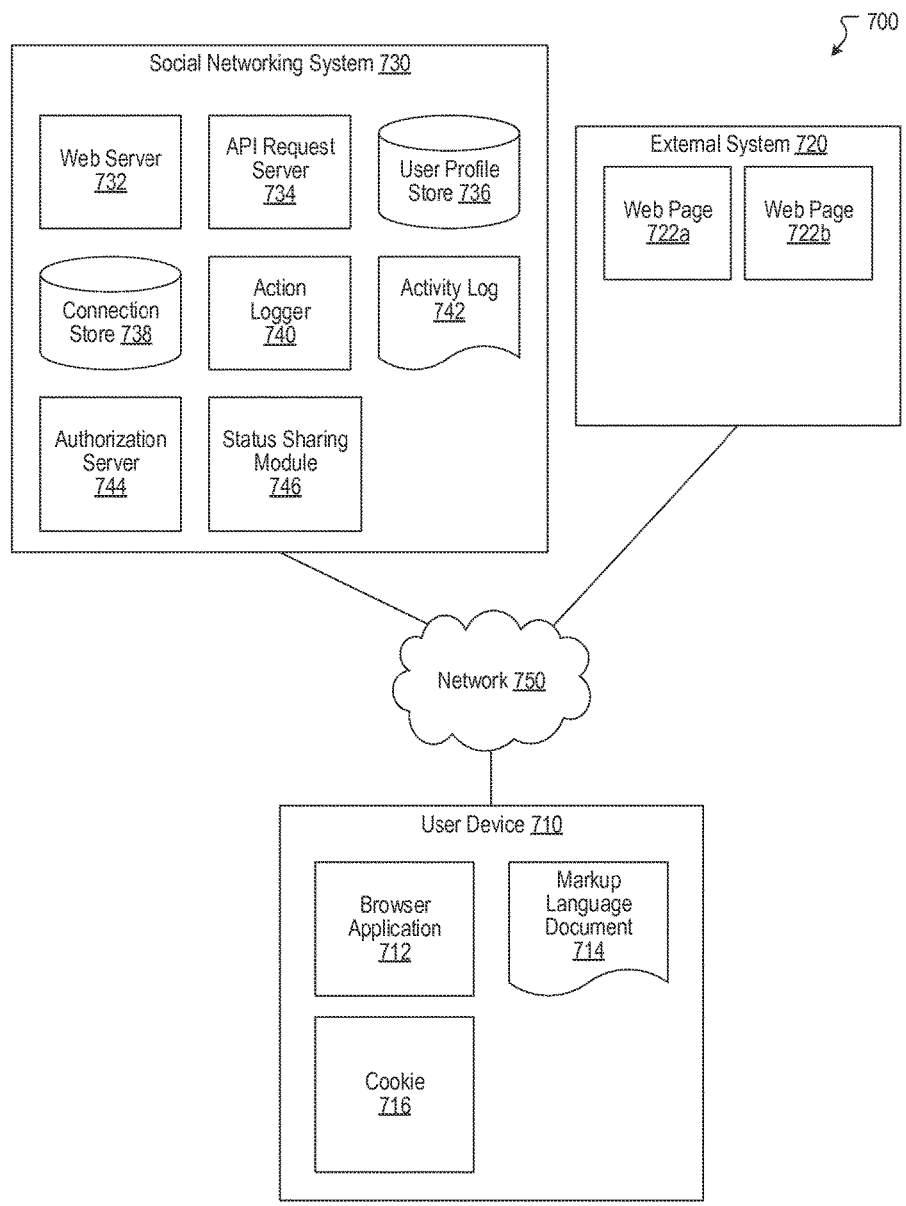
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a status sharing module 746. The status sharing module 746 can, for example, be implemented as the status sharing module 102 of FIG. 1. As discussed previously, it should be appreciated that there can be many variations or other possibilities.

Hardware Implementation

Figure 8:
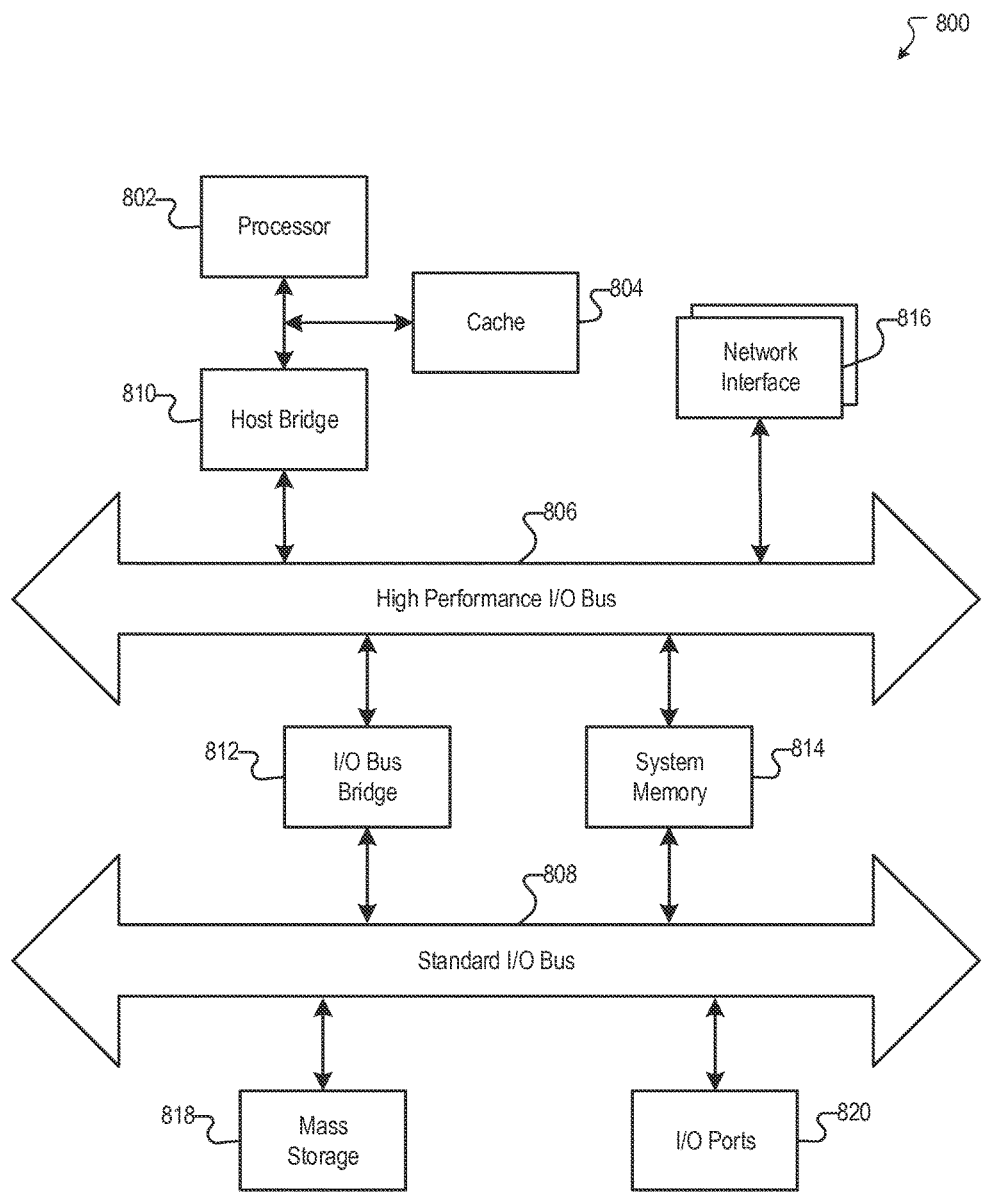
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    accessing, by a computing device, an interface through which respective status updates of one or more users of a social networking system are provided, wherein each status update of the one or more users indicates at least a respective activity and a respective geographic location corresponding to the respective activity;
    determining, by the computing device, that a first user has selected an option for setting a first status update of the first user;
    obtaining, by the computing device, information from the first user to be used for setting the first status update, wherein the obtaining further comprises:
        determining, by the computing device, at least one prior activity previously performed by the first user based at least in part on a first post, made to the social networking system, in which the first user is tagged; and
        determining, by the computing device, at least one first activity to be identified in the first status update based at least in part on the at least one prior activity previously performed by the first user; and
    setting, by the computing device, the first status update for the first user based at least in part on the obtained information, wherein the interface is updated to include the first status update for the first user.

2. The computer-implemented method of claim 1, wherein obtaining, by the computing device, information from the first user to be used for setting the first status update further comprises:
    receiving, by the computing device, at least a description of the at least one prior activity previously performed by the first user and a first geographic location corresponding to the at least one prior activity.

3. The computer-implemented method of claim 1, the method further comprising:
    determining, by the computing device, that the first user was tagged in a second post made by a second user through the social networking system, wherein the second post was made subsequent to the first status update, and wherein the second post indicates at least one of: a second activity or a second geographic location; and
    setting, by the computing device, a second status update for the first user based at least in part on the second post, wherein the interface is updated to replace the first status update with the second status update.

4. The computer-implemented method of claim 1, the method further comprising:
    determining, by the computing device, that the first user was tagged in a content item posted by a second user through the social networking system, wherein the content item was posted subsequent to the first status update, and wherein the content item is associated with one or more tags that indicate at least one of: a second activity or a second geographic location; and
    setting, by the computing device, a second status update for the first user based at least in part on the one or more tags, wherein the interface is updated to replace the first status update with the second status update.

5. The computer-implemented method of claim 1, wherein the at least one first activity also references a first geographic location determined for the first user.

6. The computer-implemented method of claim 1, wherein obtaining, by the computing device, information from the first user to be used for setting the first status update further comprises:

determining, by the computing device, a first geographic location of the first user;
providing, by the computing device, a second interface that includes a list of points of interest, wherein the points of interest included in the list are located within a threshold distance from the first geographic location of the first user; and
receiving, by the computing device, a selection of one of the points of interest from the list of points of interest.

7. The computer-implemented method of claim 1, further comprising:
providing, by the computing device, the first status update for the first user in a notification to at least one of the one or more users of the social networking system.

8. The computer-implemented method of claim 1, further comprising:
determining, by the computing device, that a first geographic location specified in the first status update of the first user is within a threshold distance from a second geographic location specified in a second status update of a second user;
providing, by the computing device, a first notification to the first user that includes at least a first portion of the second status update of the second user; and
providing, by the computing device, a second notification to the second user that includes at least a second portion of the first status update of the first user.

9. The computer-implemented method of claim 1, further comprising:
determining, by the computing device, that the at least one activity specified in the first status update of the first user corresponds to a second activity specified in a second status update of a second user;
providing, by the computing device, a first notification to the first user that includes at least a first portion of the second status update of the second user; and
providing, by the computing device, a second notification to the second user that includes at least a second portion of the first status update of the first user.

10. A system comprising:
at least one processor; and
a memory storing instructions that, when executed by the at least one processor, cause the system to perform:
accessing an interface through which respective status updates of one or more users of a social networking system are provided, wherein each status update of the one or more users indicates at least a respective activity and a respective geographic location corresponding to the respective activity;
determining that a first user has selected an option for setting a first status update of the first user;
obtaining information from the first user to be used for setting the first status update, wherein the obtaining further comprises:
determining at least one prior activity previously performed by the first user based at least in part on a first post, made to the social networking system, in which the first user is tagged; and
determining at least one first activity to be identified in the first status update based at least in part on at least one prior activity previously performed by the first user; and
setting the first status update for the first user based at least in part on the obtained information, wherein the interface is updated to include the first status update for the first user.

11. The system of claim 10, wherein obtaining information from the first user to be used for setting the first status update further causes the system to perform:
receiving at least a description of the at least one prior activity previously performed by the first user and a first geographic location corresponding to the at least one prior activity.

12. The system of claim 10, wherein the system further performs:
determining that the first user was tagged in a second post made by a second user through the social networking system, wherein the second post as made subsequent to the first status update, and wherein the second post indicates at least one of: a second activity or a second geographic location; and
setting a second status update for the first user based at least in part on the second post, wherein the interface is updated to replace the first status update with the second status update.

13. The system of claim 10, wherein the system further performs:
determining that the first user was tagged in a content item posted by a second user through the social networking system, wherein the content item was posted subsequent to the first status update, and wherein the content item is associated with one or more tags that indicate at least one of: a second activity or a second geographic location; and
setting a second status update for the first user based at least in part on the one or more tags, wherein the interface is updated to replace the first status update with the second status update.

14. A non-transitory computer-readable storage medium including instructions that, when executed by at least one processor of a computing system, cause the computing system to perform a method comprising:
accessing an interface through which respective status updates of one or more users of a social networking system are provided, wherein each status update of the one or more users indicates at least a respective activity and a respective geographic location corresponding to the respective activity;
determining that a first user has selected an option for setting a first status update of the first user;
obtaining information from the first user to be used for setting the first status update, wherein the obtaining further comprises:
determining at least one prior activity previously performed by the first user based at least in part on a first post, made to the social networking system, in which the first user is tagged; and
determining at least one first activity to be identified in the first status update based at least in part on at least one prior activity previously performed by the first user; and
setting the first status update for the first user based at least in part on the obtained information, wherein the interface is updated to include the first status update for the first user.

15. The non-transitory computer-readable storage medium of claim 14, wherein obtaining information from the first user to be used for setting the first status update further causes the computing system to perform:
receiving at least a description of the at least one prior activity performed by the first user and a first geographic location corresponding to the at least one prior activity.

16. The non-transitory computer-readable storage medium of claim 14, wherein the computing system further performs:
- determining that the first user was tagged in a second post made by a second user through the social networking system, wherein the second post was made subsequent to the first status update, and wherein the second post indicates at least one of: a second activity or a second geographic location; and
- setting a second status update for the first user based at least in part on the second post, wherein the interface is updated to replace the first status update with the second status update.

17. The non-transitory computer-readable storage medium of claim 14, wherein the computing system further performs:
- determining that the first user was tagged in a content item posted by a second user through the social networking system, wherein the content item was posted subsequent to the first status update, and wherein the content item is associated with one or more tags that indicate at least one of: second activity or a second geographic location; and
- setting a second status update for the first user based at least in part on the one or more tags, wherein the interface is updated to replace the first status update with the second status update.

* * * * *